US010475006B2

United States Patent
Kieffer et al.

(10) Patent No.: US 10,475,006 B2
(45) Date of Patent: Nov. 12, 2019

(54) PROCESSING PAYMENT REFUNDS FOR INVALID PAYMENT INSTRUMENTS

(71) Applicant: Walmart Apollo, LLC, Bentonville, AR (US)

(72) Inventors: Bradley Joseph Kieffer, Rogers, AR (US); Charles David Berry, Fayetteville, AR (US); Mark Matthews, Rogers, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/712,416

(22) Filed: Sep. 22, 2017

(65) Prior Publication Data

US 2018/0101828 A1   Apr. 12, 2018

Related U.S. Application Data

(60) Provisional application No. 62/404,963, filed on Oct. 6, 2016.

(51) Int. Cl.
*G06Q 20/06* (2012.01)
*G06Q 20/10* (2012.01)
(Continued)

(52) U.S. Cl.
CPC ..... *G06Q 20/0655* (2013.01); *G06Q 20/0453* (2013.01); *G06Q 20/10* (2013.01);
(Continued)

(58) Field of Classification Search
CPC .......... G06Q 20/0655; G06Q 20/0453; G06Q 20/10; G06Q 20/204; G06Q 20/351;
(Continued)

(56) References Cited

U.S. PATENT DOCUMENTS

| 7,558,758 | B2 | 7/2009 | Mccarthy et al. | |
|---|---|---|---|---|
| 8,185,439 | B2 | 5/2012 | Webb et al. | |
| 8,311,895 | B1 * | 11/2012 | Murugan | G06Q 50/28 705/26.1 |
| 8,489,483 | B1 | 7/2013 | Gillin et al. | |

(Continued)

OTHER PUBLICATIONS

International Search Report & Written Opinion in International Patent Application No. PCT/US17/52881, dated Dec. 1, 2017; 12 pages.

(Continued)

*Primary Examiner* — A. Hunter Wilder
*Assistant Examiner* — Joseph M Mutschler
(74) *Attorney, Agent, or Firm* — Schmeiser, Olsen & Watts LLP; Jason A. Murphy

(57) ABSTRACT

A refund processing system and method for automatically processing refunds to a mobile payment account of a customer is provided. The method includes the steps of receiving sales transaction information from a transaction records database, in response to a request from a point of sale device when a refund for an item is initiated, transmitting the sales transaction information to calculate an amount of funds to be refunded to a payment instrument, detecting that the payment instrument is not valid while attempting to apply the refund, and determining whether an electronic gift card is currently associated with the mobile payment account of the customer, and if so, applying the refund to the electronic gift card, and if not, creating a new electronic gift card and applying the amount of funds to the new electronic gift card.

20 Claims, 5 Drawing Sheets

(51) Int. Cl.
  *G06Q 20/20*    (2012.01)
  *G06Q 20/34*    (2012.01)
  *G06Q 30/00*    (2012.01)
  *G06Q 20/04*    (2012.01)
  *G06Q 20/36*    (2012.01)
  *G06Q 20/38*    (2012.01)
  *G06Q 20/40*    (2012.01)

(52) U.S. Cl.
  CPC ......... *G06Q 20/204* (2013.01); *G06Q 20/351* (2013.01); *G06Q 20/3672* (2013.01); *G06Q 20/389* (2013.01); *G06Q 20/407* (2013.01); *G06Q 20/4093* (2013.01); *G06Q 30/016* (2013.01)

(58) Field of Classification Search
  CPC .............. G06Q 20/3672; G06Q 20/389; G06Q 20/407; G06Q 20/4093; G06Q 30/016
  See application file for complete search history.

(56) References Cited

U.S. PATENT DOCUMENTS

| | | |
|---|---|---|
| 8,756,111 B2 | 6/2014 | Carpenter |
| 9,218,599 B1 | 12/2015 | Hilbring |
| 9,275,506 B1 | 3/2016 | Whitmore |
| 2010/0010918 A1 | 1/2010 | Hunt |
| 2012/0246064 A1 | 9/2012 | Balkow |
| 2014/0279509 A1 | 9/2014 | Khilnani et al. |
| 2014/0351132 A1 | 11/2014 | Wieler et al. |
| 2016/0189154 A1 | 6/2016 | Eramian et al. |

OTHER PUBLICATIONS

"Gift Card—Terms and Conditions," TaylorMadeGolf.com, accessed Jul. 24, 2015.
International Preliminary Report on Patentability for International Application No. PCT/US2017/052881 dated Apr. 18, 2019.

* cited by examiner

PROCESSING PAYMENT REFUNDS FOR INVALID PAYMENT INSTRUMENTS

RELATED APPLICATIONS

This application claims priority to U.S. provisional patent application Ser. No. 62/404,963, filed Oct. 6, 2016, entitled "Processing Payment refunds for Invalid Payment Instruments" the contents of which are incorporated by reference herein in their entirety.

TECHNICAL FIELD

The following relates to systems and methods for automatically processing refunds to an electronic gift card, and more specifically to embodiments of a method for processing payment refunds in the event an original payment instrument is invalid at a time of a refund.

BACKGROUND

Most retailers offer the ability for customers to return a product previously purchased from that retailer. When the customer returns the product, the retailer generally applies a refund to the customer's payment instrument, such as a credit card or a debit card, for the amount of funds used to purchase that product. Sometimes, during the refund/return exchange, the customer's payment instrument to receive the refund amount is no longer valid. For instance, the customer's credit card may have expired, or the bank account associated with the debit card may have been closed. In that instance, retailers at a point of sale (POS) must apply the funds to a physical gift card. This requires an additional step at the POS to activate and load the physical gift card with the funds for the refund/return. Further, the customer now has to remember to both bring the physical gift card with them to use the physical gift card for a next purchase.

Thus, a need exists for a system for automatically processing refunds to an electronic gift card, and more specifically to embodiments of a method and system for processing payment refunds in the event an original payment instrument is invalid at a time of a refund.

SUMMARY

An embodiment of the present invention relates to a method, and associated computer system and computer program product, for automatically processing refunds. A processor of a computing system detects that a payment instrument used to make a purchase is invalid during a refund process. The computer system determines whether the customer currently has an electronic gift card associated with a mobile payment account, or if a new electronic gift card should be created. A refund is then applied to the existing electronic gift card or the newly created gift card, associated with the mobile payment account of the customer.

DETAILED DESCRIPTION

In the event a customer's payment instrument used to originally purchase a store product is determined to be invalid, retailers typically offer in-store credit and apply funds to a physical gift card, which must be carried around by the customer and presented at the POS to use the funds applied to the physical gift card. However, by utilizing a datastore to maintain payment tenders and/or payment instruments used during an original sales transaction for a particular product that is being returned, the validity of the payment instrument can determined while the customer is still at the POS. If the payment instrument is no longer valid (e.g. if expired, account closed), then funds can be automatically loaded onto an electronic gift card (E-Gift Card). If the customer does not already have an E-Gift card associated with the customer's mobile payment account, a new E-Gift card may be automatically created and linked to the customer's mobile payment account.

Figure 1:
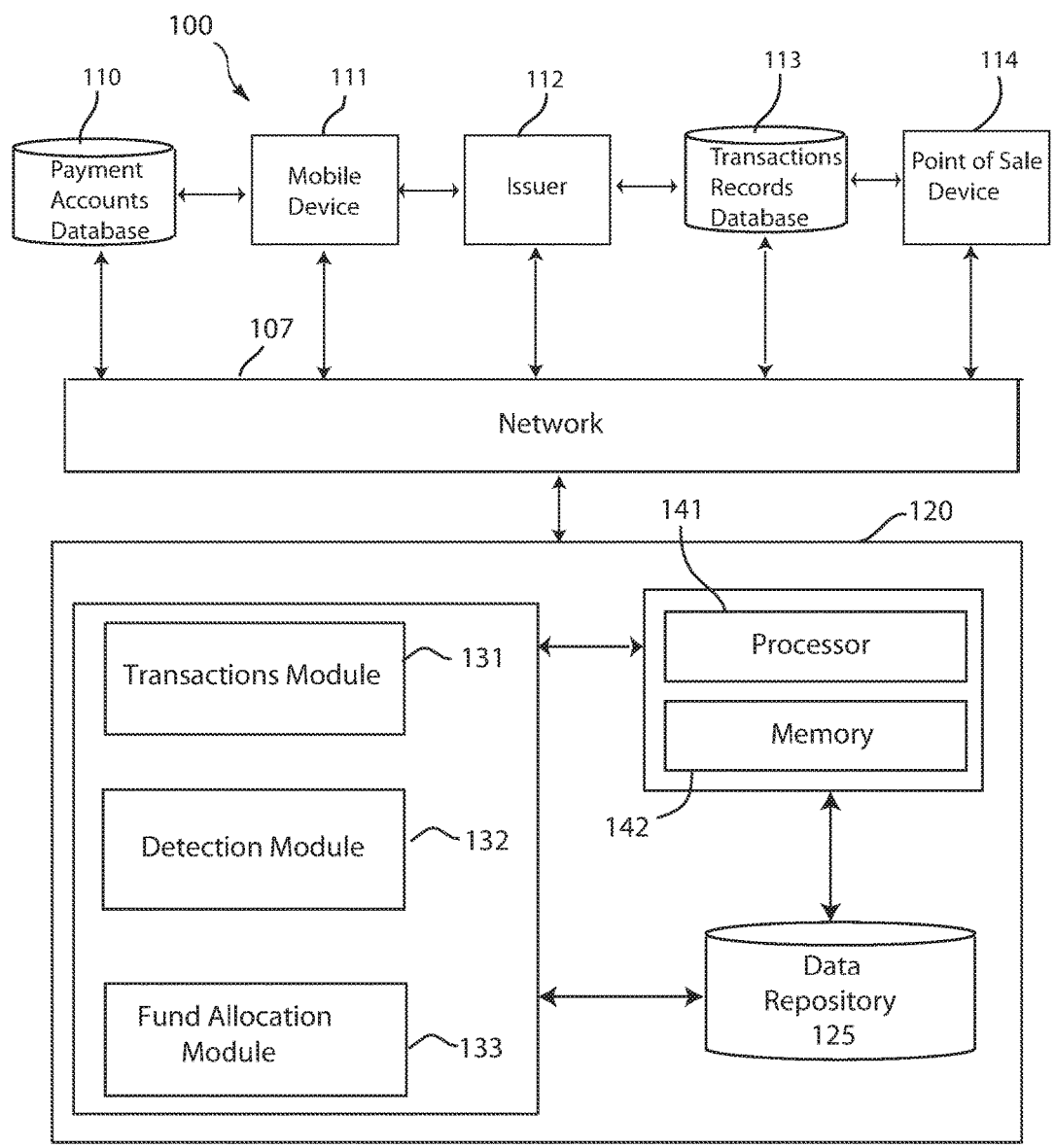
FIG. 1 depicts a block diagram of a refund processing system, in accordance with embodiments of the present invention.

Referring now to the drawings, FIG. 1 depicts a block diagram of a refund processing system 100, in accordance with embodiments of the present invention. Embodiments of the refund processing system 100 may run on one or more servers, servers systems, or other hardware devices, computing devices, and the like. The refund processing system 100 may receive one or more requests from the POS device 114 when a refund/return/exchange is initiated at the POS device 114, and retrieve or receive sales transaction information from a transactions records database 113. The received sales information may be used to calculate an amount of funds to be refunded to the customer looking to return one or more products. If the original payment instrument is determined to be invalid or otherwise unusable to complete the refund transaction, then the funds can be applied to a current E-Gift card associated with a mobile payment account of the customer, according to preferences set forth in the mobile payment account. If the customer does not currently have an E-Gift card associated with a mobile account of the retailer, then a new E-Gift card can be created and linked to the customer's mobile account for future use. In either event, the POS device 114 may be notified that the funds have been applied to an E-Gift card, and the customer no longer needs to keep the physical gift card with them for future purchases, and time can be saved and labor reduced at the POS device 114, as well as material costs reduced, from not having to create, load, activate, and distribute a physical gift card to the customer.

Embodiments of refund processing system 100 may include a computing system 120 coupled to a network 107. Computing system 120 may be a computing device, one or more computing devices, a hardware device, a storage device, a server, one or more servers, a server system, and the like. A network 107 may refer to a group of two or more computer systems linked together. Network 107 may be any type of computer network known by individuals skilled in the art. Examples of computer networks 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the computer network 107 may be a peer-to-peer network in some embodiments, wherein in other embodiments, the network 107 may be organized as a client/server architecture. Embodiments of network 107 may be comprised of more than one network.

In some embodiments, the network 107 may further comprise, in addition to the computer system 120, a connection to one or more network accessible knowledge bases containing information of the user, network repositories or other systems connected to the network 107 that may be considered nodes of the network 107. In some embodiments, where the computing system 120 or network repositories allocate resources to be used by the other nodes of the network 107, the computer system 120 and network repository 114 may be referred to as servers.

The network repository may be a data collection area on the network 107 which may back up and save all the data transmitted back and forth between the nodes of the network 107. For example, the network repository 114 may be a data center saving and cataloging user transactions with a retailer, to generate both historical and predictive reports regarding a particular user. In some embodiments, a data collection center housing the network repository may include an analytic module capable of analyzing each piece of data being stored by the network repository. Further, the computer system 120 may be integrated with or as a part of the data collection center housing the network repository. In some alternative embodiments, the network repository may be a local repository (not shown) that is connected to the computer system 120.

Referring still to FIG. 1, embodiments of the computer system 120 may be equipped with a memory device 142 which may store the various user information, transactions, product information, mobile payment account information, and the like, and a processor 141 for implementing the tasks associated with the refund processing system 100.

Furthermore, embodiments of computer system 120 may include a transactions module 131, a detection module 132, and a fund allocation module 133. A "module" may refer to a hardware based module, software based module or a module may be a combination of hardware and software. Embodiments of hardware based modules may include self-contained components such as chipsets, specialized circuitry and one or more memory devices, while a software-based module may be part of a program code or linked to the program code containing specific programmed instructions, which may be loaded in the memory device of the computer system 120. A module (whether hardware, software, or a combination thereof) may be designed to implement or execute one or more particular functions or routines.

Embodiments of the transactions module 131 may include one or more components of hardware and/or software program code for processing sales transaction information. The transactions module 131 may receive a request from a point of sale device 114 as a refund is initiated at the point of sale device 114. Embodiments of a point of sale device 114 may include a cashier's register/computer terminal at a brick and mortal retail location, a computer terminal, a point of sale terminal, a handheld computer terminal, a computing device, a mobile device, or any device that can process a return of a store item. Embodiments of the point of sale device 114 may process payments from a customer, track orders, connect to other systems on a network, including a transactions records database 113, and send a receive communications to the computing system 120. In an exemplary embodiment, when a customer intends to return an item for a refund, that process may begin at the point of sale device 114, and as a result, the transactions module 131 of the computing system 120 may receive a request from the point of sale device 114 when the refund process is initiated. In other words, the point of sale device 114 may retrieve the sales transaction information from the records transaction database 113 by sending a request to computing system 120 to perform such a function. Accordingly, in response to the request received by the transactions module 131 from the point of sale device 114, the transactions module 131 may retrieve a sales transaction information relating to an original (or previous) purchase of the store item being returned by the customer. For instance, embodiments of the transaction module 131 may retrieve, obtain, receive, request, determine, etc., from the transactions record database 113, information and details regarding the original transaction for the store item between the customer and the retailer. The sales transaction information received by the transactions module 131 may include line items, payment data, product identifying information, the name of the customer, the store location the item was initially purchased, an account number, a transaction ID, an address of the customer, payment instrument information, a purchase amount, and the like, or any information that may be utilized for processing a refund. The sales transaction information received by the transaction module 131 from the transactions records database 114 may then be transmitted to the point of sale device 114.

The point of salve 114 may use the sales transaction information transmitted by the transactions module 131 to calculate an amount to refund to the customer for the store item(s) being returned. Embodiments of the point of sale device 114 may examine or otherwise analyze the sales transaction information to determine an amount of funds to be refunded onto a payment instrument used by the customer to complete the initial (or previous) transaction. For example, the point of salve device 114 may determine payment processing information necessary to process and complete the refund process from the sales transaction information, as well as determine the amount of money that should be applied to the payment instrument used by the customer to purchase the returned item. A payment instrument may refer to a credit card, a debit card, a checking account, a bank account, a deposit account, any account offered by a financial institution, a negotiable instrument, a payment device, a mobile wallet, an electronic funds application, and the like. Alternatively, the transactions module 131 may examine or otherwise analyze the sales transaction information received from the records transactions database 113 to determine an amount of funds to be refunded onto the payment instrument used by the customer to complete the initial (or previous) transaction. For example, the transactions module 131 may determine payment processing information necessary to process and complete the refund process from the sales transaction information, as well as determine the amount of money that should be applied to the payment instrument used by the customer to purchase the returned item, and notify the point of sale device 114.

With continued reference to FIG. 1, embodiments of the computing system 120 may further include a detection module 132. Embodiments of the detection module 132 may include one or more components of hardware and/or software program code for detecting that the payment instrument to receive the refund is invalid. For example, the detection module 132 may determine a status of the payment instrument used to purchase the store item, wherein the status can be valid or invalid. A status of valid may mean that the payment instrument has not expired, is active, and/or a channel or connection to the payment instrument can be established at the time of the refund. A status of invalid may mean that the payment instrument has expired, is inactive, or a channel or connection to the payment instrument cannot be established at the time of the refund. To determine a status of the payment instrument, embodiments of the detection module 132 may retrieve, receive, obtain, derive, etc. a payment instrument status from a payment accounts database 110. Embodiments of the payment accounts database 110 may be one or more databases, storage devices, repositories, and the like, that may store or otherwise contain information and/or data regarding a status of the payment instrument. The payment accounts database 110 may be accessed over network 107, and may be affiliated with, managed, and/or controlled by one or more financial institutions, issuers, authorizers, and the like. The detection module 132 may query the payment accounts database 110 to determine whether or not the payment instrument used in the original or previous transaction for the store item being returned is valid or invalid. In some embodiments, the detection module 132 may also send an authorization request to the issuer 112 to determine a validity of the payment instrument. If the detection module 132 determines that the payment instrument is valid, then the detection module 132 may instruct the issuer 112, or an authorizer to proceed with refunding the proper amount of funds to the valid payment instrument to complete the refund process. The detection module 132 may complete the refund process and notify the point of sale device 113. Alternatively, the detection module 132 may send a request to the issuer 110, and then transmit authorization to the point of sale device 114 to proceed with the refund to the proper account/payment instrument. In further embodiments, the detection module 132 may determine a status of the payment instrument by accessing the payment accounts database 110 at the same time or concurrently with the transaction module 131 accessing the transactions records database 113 to retrieve or otherwise receive the sales transaction information.

If the detection module 132 determines or detects that the payment instrument is invalid, then the detection module 132 may determine if an electronic gift card is associated with a mobile payment account of a user. For instance, the detection module 132 may communicate with a mobile device 111 associated with the customer to determine whether an electronic gift card already exists and is linked to the mobile device 111 of the customer. In an exemplary embodiment, the detection module 132 may communicate with an application loaded on the user's mobile device 111 to access a local storage of the mobile device 111, which may contain data regarding an existing electronic funds account, or an electronic gift card account. In another embodiment, the detection module 132 may communicate with a remote server or remote storage device that may include data regarding an electronic funds account associated with an application loaded on the customer's mobile device 111. Moreover, embodiments of the detection module 132 may also access customer preferences that may be saved on the mobile device 111, or may access a server associated with the mobile account of the mobile device 111, to determine a preferred payment method or a preferred payment instrument to receive the refund if the originally or previously used payment instrument is no longer valid. The customer's preferences may also indicate an alternative payment instrument to be used in the event the payment instrument used for the purchase expires, or cannot access the payment instrument over the network 107 at the time of the refund. Accordingly, the detection module 132 may determine that the payment instrument is invalid, and may proceed according to one or more of a customer's preference.

Embodiments of the computing system 120 may further include a fund allocation module 133. Embodiments of the fund allocation module 133 may include one or more components of hardware and/or software program code for applying funds to an electronic gift card account associated with a customer's mobile account/device 111, or a payment account preselected by the customer. If the payment instrument is determined to be invalid, and a current electronic gift card account exists with respect to the customer's mobile device 111 or mobile payment account, then the fund allocation module 133 may retrieve or otherwise receive data associated with that electronic gift card that is on file. In an exemplary embodiment, the fund allocation module 133 may communicate with the mobile device 111 and/or the payment accounts database 113 to obtain the current electronic gift card information, such as account information, balance information, identifying information to optionally verify an identity of the customer with a particular mobile account, etc. The fund allocation module 133 may then instruct the issuer 112 to apply the proper funds from the refund calculated by either the point of salve device 114 or the transaction module 131 to the existing electronic gift card. Because the fund allocation module 133 facilitates the refund amount to be applied to a current electronic gift card, the retailer does not need to create, distribute, authorize, and activate a physical gift card, and the customer does not need to carry the physical gift card with them to use the allocated funds.

If the payment instrument is determined to be invalid, and a current electronic gift card account does not exist with respect to the customer's mobile device 111 or mobile payment account, then the fund allocation module 133 may communicate with the issuer 112 to request that a new electronic gift card be created for the customer's mobile device payment account. The new electronic gift card may be created, and then fund allocation module 133 may store the new electronic gift card information/account with a storage device, remote or otherwise, such as the payment accounts database 113. In an exemplary embodiment, the fund allocation module 133 may transmit to the mobile device 111 or to the payment accounts database 113 information/data relating to the new electronic gift card information, such as account information, balance information, identifying information to optionally verify an identity of the customer with a particular mobile account, etc. Alternatively, the fund allocation module 133 may instruct the issuer 112 to transmit the data/information associated with the new electronic gift card to the payment accounts database 113 and/or the mobile device 111. The fund allocation module 133 may then instruct the issuer 112 to apply the proper funds from the refund calculated by either the point of salve device 114 or the transaction module 131 to the new electronic gift card. Because the fund allocation module 133 facilitates the refund amount to be applied to a new electronic gift card, the retailer does not need to create, distribute, authorize, and activate a physical gift card, and the customer does not need to carry the physical gift card with them to use the allocated funds. Further, embodiments of the fund allocation module 133 may notify the point of sale device 114 that the funds have been allocated so that the refund transaction can be completed. The fund allocation module 133 may also send a notification to the mobile device 111 that a new electronic gift card has been created, with an available balance. Alternatively, the fund allocation module 133 may instruct the point of sale device 114 to send notifications to the mobile device 111, and alert other back end components of the system 100 that the transaction has been completed, and that a new electronic gift card has been successfully created.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention). Moreover, embodiments of the refund processing system 100 may improve mobile payment technology and payment account security by detecting whether payment accounts are valid and verifying that the customer is the owner of the mobile payment account, as well as providing a new option to establish a new electronic gift which may be applied to the owner's mobile account, as opposed to distributing a physical gift card or cash in exchange for the return product. This may also improve fraud and identity theft technology by refunding monies to an electronic account as opposed to distributing the physical gift card to the person who is standing at the point of sale, who may not actually be the purchaser of the item, even though they have a paper receipt.

Figure 2:
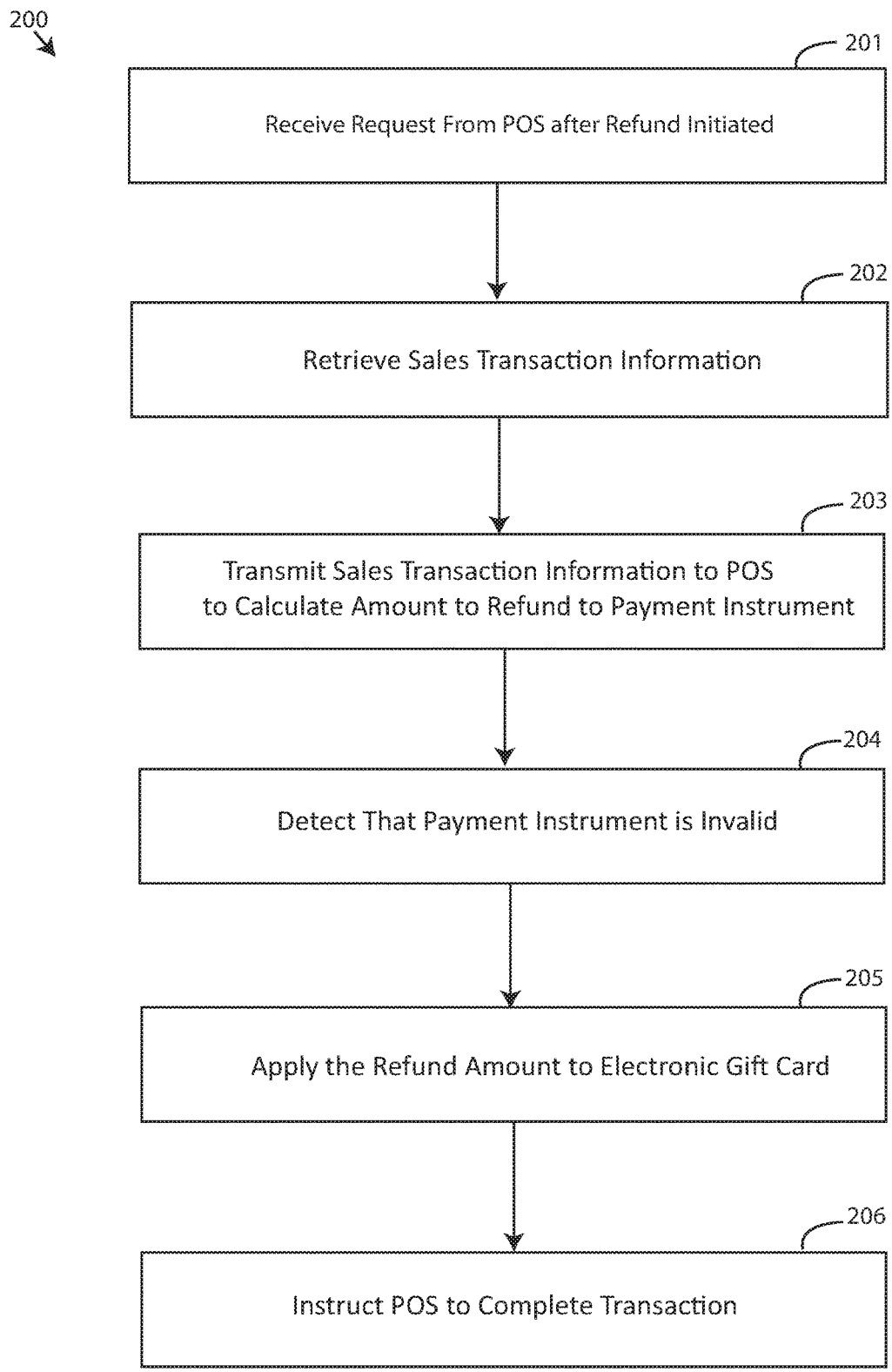
FIG. 2 depicts a flow chart of a method for automatically processing refunds, in accordance with embodiments of the present invention.

Referring now to FIG. 2, which depicts a flow chart of a method 200 for automatically processing refunds to a mobile payment account of a customer, in accordance with embodiments of the present invention. One embodiment of a method 200 or algorithm that may be implemented for automatically processing refunds to a mobile payment account of a customer in accordance with the refund processing system 100 described in FIG. 1 using one or more computer systems as defined generically in FIG. 5 below, and more specifically by the specific embodiments of FIG. 1.

Embodiments of the method 200 for automatically processing refunds to a mobile payment account of a customer, in accordance with embodiments of the present invention may begin at step 201 wherein a request is received from a point of sale device 114 to acquire a sales transaction information relating to a return of one or more store items. For example, if a customer enters a retailer to return a store item at a point of sale device 114, the point of sale device 114 may request the computing system 120 to retrieve the sales transaction pertaining to the transaction for the purchase of the store items to be returned. Step 202 receives the sales transaction information from the transactions records database 113, in response to the request from the point of sale device 113. Step 203 transmits the sales transaction information to the point of the sale device 114 so that an amount of funds to be returned are accurately calculated, and the payment instrument used to purchase the store item is identified. Step 204 detects that the payment instrument is invalid during the processing of the refund for the one or more store items.

Figure 3:
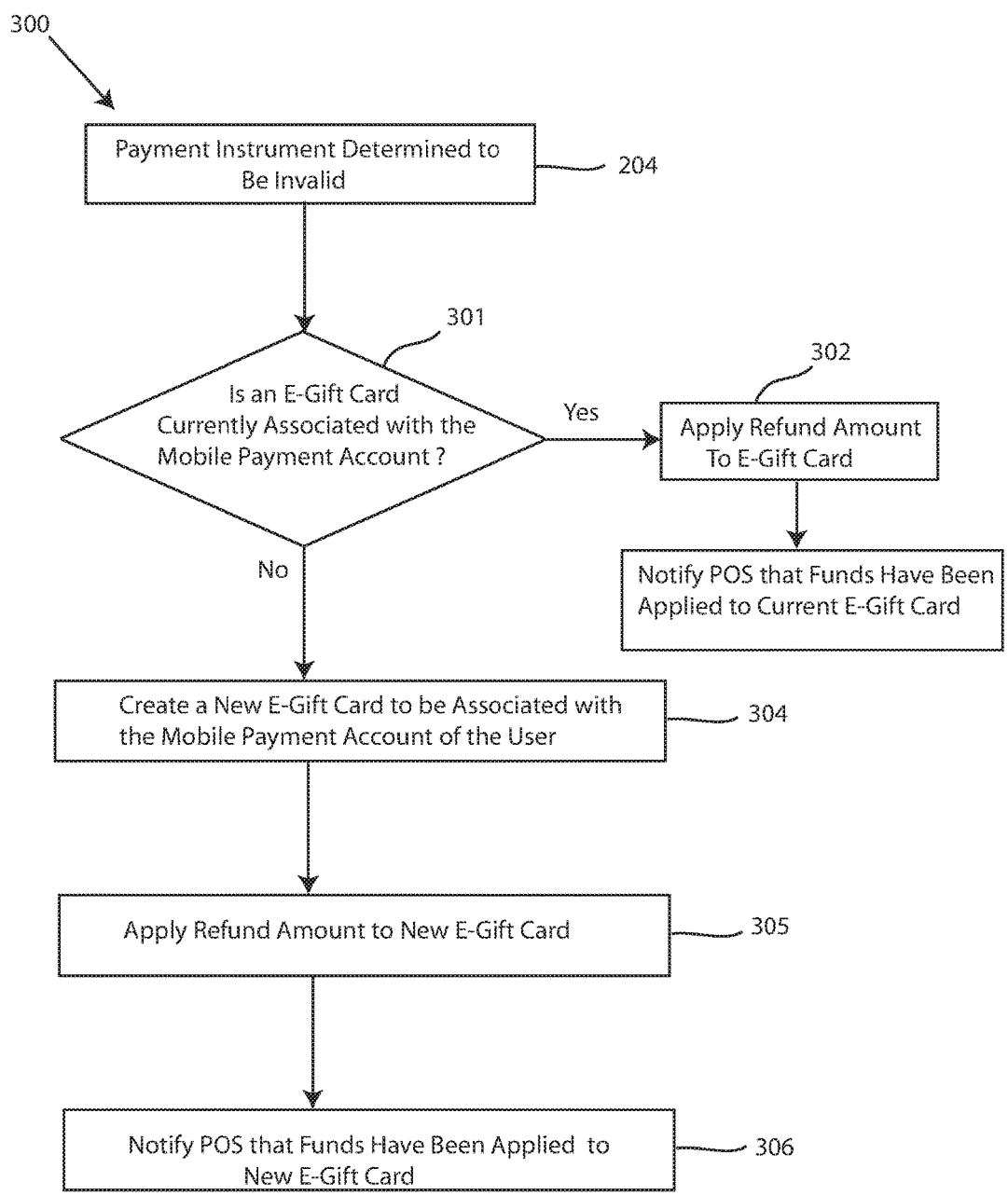
FIG. 3 depicts a flowchart of a step of the method of FIG. 2, in accordance with embodiments of the present invention.

FIG. 3 depicts a flow chart of step 204 of the method 200 of FIG. 2, when the payment instrument is detected to be invalid, in accordance with embodiments of the present invention. Step 301 determines whether an electronic gift card is currently associated with a mobile payment account of the customer initiating the refund process. For example, an inquiry is made to pull data relating to an existing electronic gift card or other electronic funds account stored on or otherwise linked to a mobile payment account, a mobile device, a mobile wallet, a money management application on the mobile device 111, and the like. If a current electronic gift card exists, then the data is retrieved, obtained, or otherwise received and may be used to verify a customer identity, a status, a validity, and the like. Step 302 applies the refund amount to the existing or current electronic gift card linked or otherwise associated with a mobile payment account of the customer. If a current electronic gift card does not exist or is linked with the mobile payment account of the customer, then step 304 may create a new electronic gift card to be associated with the mobile payment account of the customer/user. The new electronic gift card may be created by an electronic gift card creator, such as issuer 112, or another authorizer. Step 305 applies the refund amount to the newly created electronic gift card, and may also alert other components and devices of the refund processing system 100 that a new electronic gift card has been created, and funds are now available. Step 306 notifies the point of sale device 114 that the funds have been applied to complete the refund transaction with the customer.

Referring back to FIG. 2, step 205 applies the refund amount to the mobile payment account of the customer, to either an existing electronic gift card or a newly created electronic gift card. Step 206 instructs the point of sale device 114 to complete the refund transaction.

Figure 4:
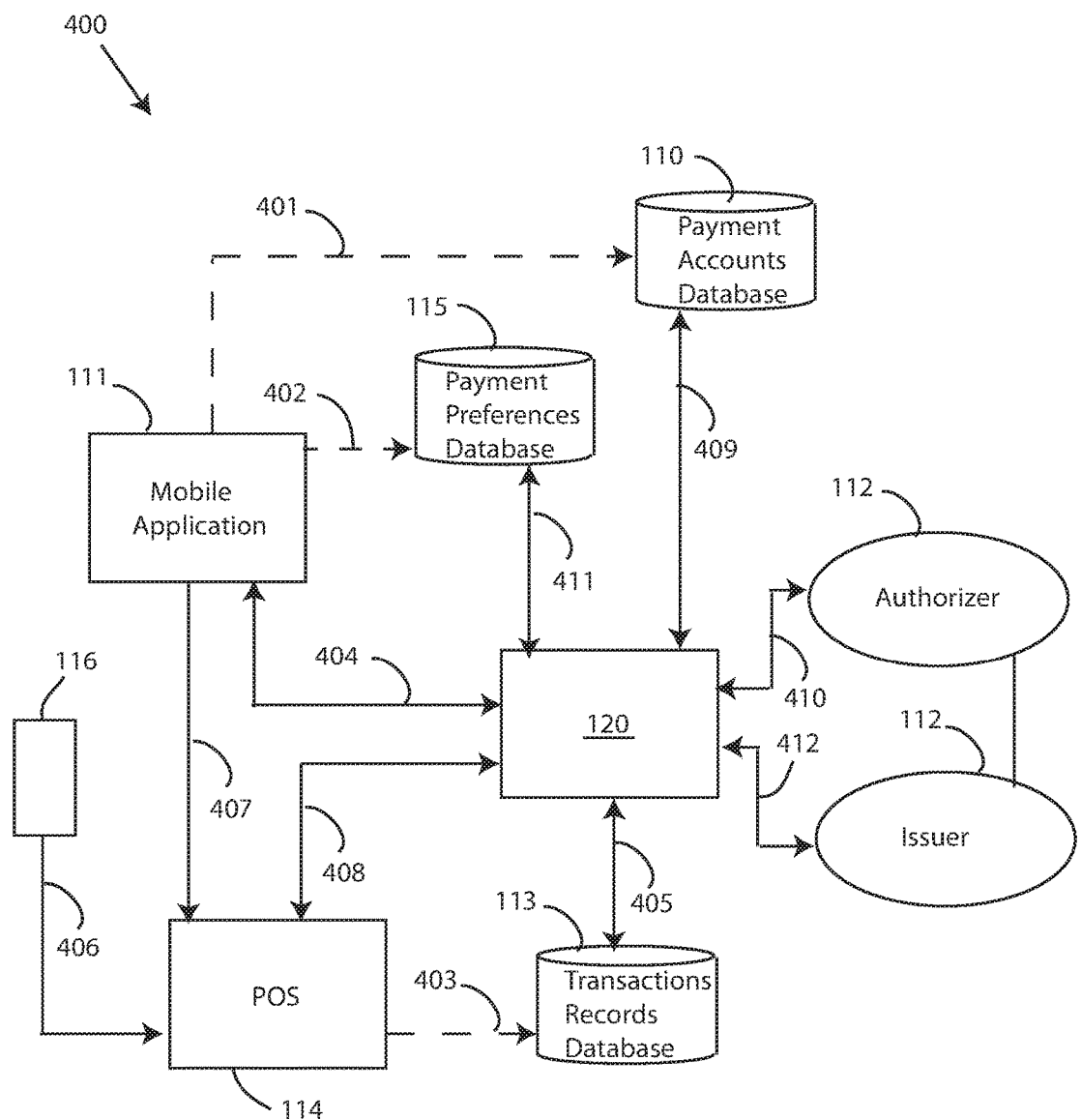
FIG. 4 depicts a workflow diagram of the method of FIG. 2, in accordance with embodiments of the present invention.

The following scenario is described for exemplary purposes to show an embodiment of the implementation of method 200, with the aid of FIG. 4, which depicts a workflow schematic in accordance with embodiments of the present invention:

A customer visits a retailer to return a pair of shoes purchased at the retailer a few weeks prior. The customer is a frequent shopper at the retailer, and has previously downloaded a mobile application to the customer's smartphone, and activated a mobile payment account feature, depicted at 401, which allows the customer to make payments at the retailer using their smartphone at a point of sale 114, earning rewards from the retailer. The customer frequently uses a credit card with account number xxx54, and has indicated that the credit card with account number xxx54 is the preferred method of payment, depicted at 402, so that the customer does not have to select the method of payment each time at the point of sale 114. The customer used the credit card with account number xxx54 to purchase the shoes the customer is now returning, which means that the mobile payment account information is stored on a transactions record database 113, depicted at 403.

When the customer arrives at the point of sale, the customer presents a paper receipt 116 (or an electronic receipt), depicted at 407, but also uses the customer's smartphone to locate a record of the transaction, which is accessible from the smartphone using the retailer's mobile application, depicted at 404, 405. A representative, at the point of sale, scans a bar code on the paper receipt 116, depicted at 406, and confirms the identity of the transaction from the mobile payment account, depicted at 407. The point of sale 114 receives the sales transaction from the computing system 120, depicted at 408, 405. Using the sales transaction information, the point of sale device 114 indicates to the representative that the customer should be refunded $xx.xx for the costs of the shoes. While the representative initiates the refund, the point of sale device 114 is notified that the credit card with account number xxx54 has since expired, depicted at 409, 408. The customer's preferences are checked, but do not provide an alternative payment instrument for adding refunds, depicted at 411. Similarly, the customer does not have an existing electronic gift card, so a new electronic gift card is created by the issuer 112, for the customer, depicted at 412. The new electronic gift card information is stored on a database 110, depicted at 409, and the funds are loaded on the new electronic gift card in the amount of $xx.xx.

Accordingly, embodiments of method 200 for automatically processing refunds may be implemented to avoid issuing physical gift cards to complete a refund, as well as provide a convenient and mobile payment method in the event the original payment instrument is invalid.

Figure 5:
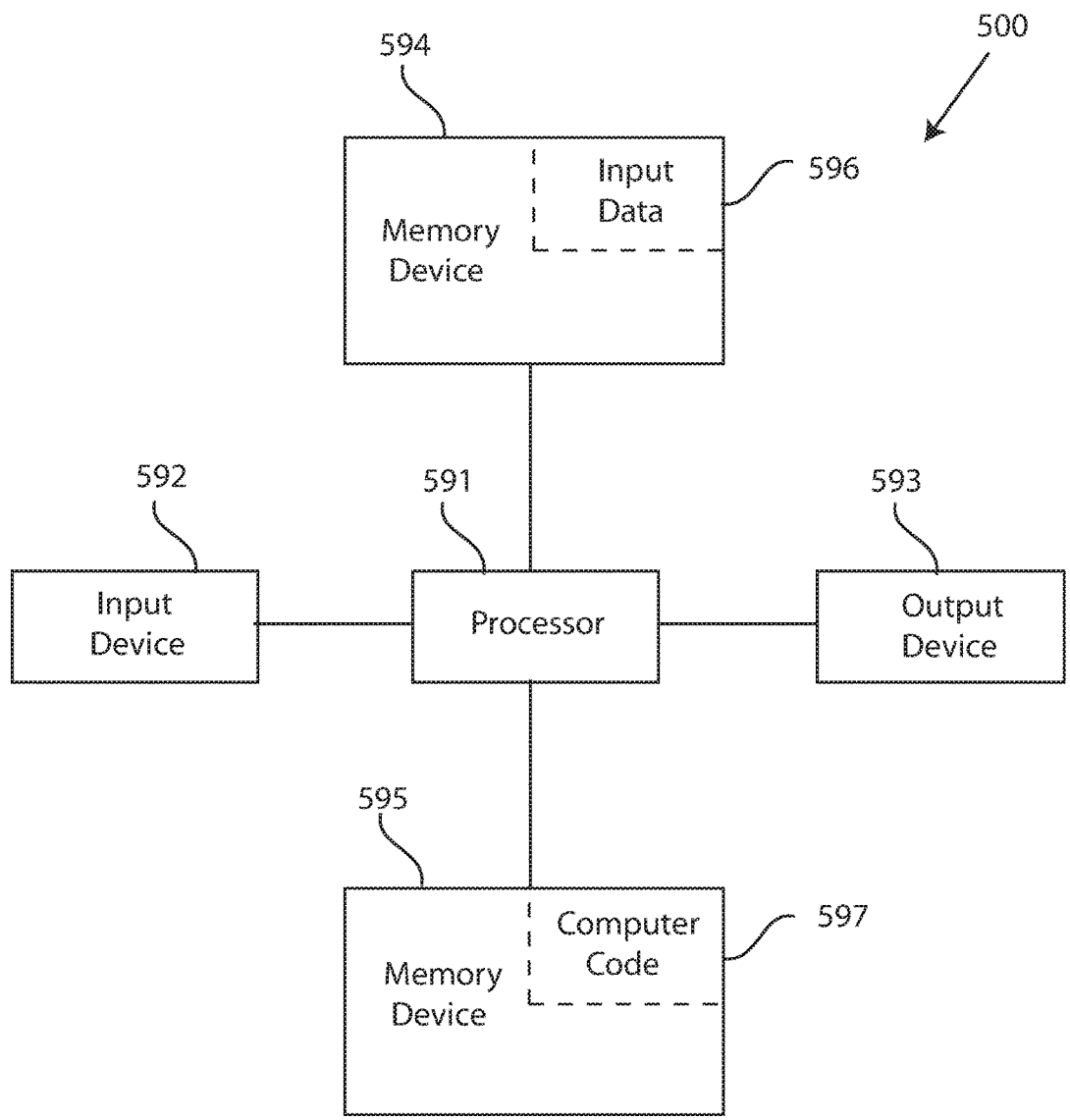
FIG. 5 illustrates a block diagram of a computer system for the refund processing system of FIG. 1, capable of implementing methods f for automatically processing refunds of FIG. 2, in accordance with embodiments of the present invention.

FIG. 5 illustrates a block diagram of a computer system 500 that may be included in the system of FIG. 1 and for implementing the methods of FIG. 2 in accordance with the embodiments of the present disclosure. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer 500, including executing instructions included in the computer code 597 for the tools and programs capable of implementing a method for automatically processing refunds to a mobile payment account of a customer, in the manner prescribed by the embodiments of FIGS. 2-4 using the refund processing system of FIG. 1, wherein the instructions of the computer code 597 may be executed by processor 591 via memory device 595. The computer code 597 may include software or program instructions that may implement one or more algorithms for implementing the methods for automatically processing refunds to a mobile payment account of a customer, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 5.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to calendar processing systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer 500) including one or more processor(s) 591, wherein the processor(s) carry out instructions contained in the computer code 597 causing the computer system to automatically process a refund in accordance with embodiments of the present invention. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for automatically processing refunds. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for automatically processing refunds to a mobile payment account of a customer.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for automatically processing refunds to a mobile payment account of a customer comprising:
    receiving, by a processor of a computing system, sales transaction information from a transaction records database, in response to a request from a point of sale device when a refund for an item is initiated at the point of sale device by scanning a user mobile device at the point of sale;
    transmitting, by the processor, the sales transaction information to the point of sale device to calculate an amount of funds to be refunded to a payment instrument of the customer used to purchase the item;
    detecting, by the processor, that the payment instrument is not valid while attempting to apply the amount of funds to the payment instrument;
    communicating, by the processor, with the user mobile device to check if an electronic gift card currently exists and is linked to the mobile payment account associated with the user mobile device, in response to the detecting that the payment instrument is not valid;
    generating, by the processor, a new electronic gift card for addition to the mobile payment account associated with the user mobile device, as a result of the checking; and
    applying, by the processor, the amount of funds to the new electronic gift card, thereby avoiding a need to distribute a physical gift card to the user at the point of sale.

2. The method of claim 1, wherein the mobile payment account of the customer is managed on the user mobile device.

3. The method of claim 1, wherein the detecting including obtaining, by the processor, information of the payment instrument from a payment accounts database.

4. The method of claim 1, wherein prior to the generating step, accessing, by the processor, the mobile payment account to retrieve a customer preference for receiving a refund.

5. The method of claim 1, further comprising updating, by the processor, the mobile payment account of the user that the new electronic gift card has been created.

6. The method of claim 1, wherein the amount of funds are applied to the electronic gift card or the new gift card by requesting, by the processor, that an issuer apply the amount of funds to the electronic gift card or the new gift card.

7. The method of claim 1, further wherein the step of creating the new electronic gift card comprises sending, by the processor, a request to an authorizer to establish the new electronic gift card, and providing, by the processor, the new electronic gift card data to the payment accounts database.

8. The method of claim 1, further comprising notifying, by the processor, the point of sale device that the amount of funds have been applied to the electronic gift card or the new electronic gift card, to finish the transaction with the customer.

9. A computer system, comprising:
    a processor;
    a memory device coupled to the processor; and
    a computer readable storage device coupled to the processor, wherein the storage device contains program code executable by the processor via the memory device to implement a method for automatically processing refunds to a mobile payment account of a customer, the method comprising:
        retrieving, by a processor of a computing system, sales transaction information from a transaction records database, in response to a request from a point of sale device when a refund for an item is initiated at the point of sale device by scanning a user mobile device at the point of sale;
        transmitting, by the processor, the sales transaction information to the point of sale device to calculate an amount of funds to be refunded to a payment instrument of the customer used to purchase the item;
        detecting, by the processor, that the payment instrument is not valid while attempting to apply the amount of funds to the payment instrument;
        communicating, by the processor, with the user mobile device to check if an electronic gift card currently exists and is linked to the mobile payment account associated with the user mobile device, in response to the detecting that the payment instrument is not valid;
        generating, by the processor, a new electronic gift card for addition to the mobile payment account associated with the user mobile device, as a result of the checking; and
    applying, by the processor, the amount of funds to the new electronic gift card, thereby avoiding a need to distribute a physical gift card to the user at the point of sale.

10. The computer system of claim 9, wherein the mobile payment account of the customer is managed on the user mobile device.

11. The computer system of claim 9, wherein the detecting including obtaining, by the processor, information of the payment instrument from a payment accounts database.

12. The computer system of claim 9, wherein prior to the generating step, accessing, by the processor, the mobile payment account to retrieve a customer preference for receiving a refund.

13. The computer system of claim 9, further comprising updating, by the processor, the mobile payment account of the user that the new electronic gift card has been created.

14. The computer system of claim 9, wherein the amount of funds are applied to the electronic gift card or the new gift card by requesting, by the processor, that an issuer apply the amount of funds to the electronic gift card or the new gift card.

15. The computer system of claim 9, further wherein the step of creating the new electronic gift card comprises sending, by the processor, a request to an authorizer to establish the new electronic gift card, and providing, by the processor, the new electronic gift card data to the payment accounts database.

16. A computer program product, comprising a computer readable hardware storage device storing a computer readable program code, the computer readable program code comprising an algorithm that when executed by a computer processor of a computing system implements a method for automatically processing refunds to a mobile payment account of a customer, comprising:

retrieving, by a processor of a computing system, sales transaction information from a transaction records database, in response to a request from a point of sale device when a refund for an item is initiated at the point of sale device by scanning a user mobile device at the point of sale;

transmitting, by the processor, the sales transaction information to the point of sale device to calculate an amount of funds to be refunded to a payment instrument of the customer used to purchase the item;

detecting, by the processor, that the payment instrument is not valid while attempting to apply the amount of funds to the payment instrument;

communicating, by the processor, with the user mobile device to check if an electronic gift card currently exists and is linked to the mobile payment account associated with the user mobile device, in response to the detecting that the payment instrument is not valid;

generating, by the processor, a new electronic gift card for addition to the mobile payment account associated with the user mobile device, as a result of the checking; and applying, by the processor, the amount of funds to the new electronic gift card, thereby avoiding a need to distribute a physical gift card to the user at the point of sale.

17. The computer program product of claim 16, wherein the mobile payment account of the customer is managed on the user mobile device.

18. The computer program product of claim 16, wherein prior to the generating step, accessing, by the processor, the mobile payment account to retrieve a customer preference for receiving a refund.

19. The computer program product of claim 16, further comprising updating, by the processor, the mobile payment account of the user that the new electronic gift card has been created.

20. The computer program product of claim 16, wherein the amount of funds are applied to the electronic gift card or the new gift card by requesting, by the processor, that an issuer apply the amount of funds to the electronic gift card or the new gift card.

\* \* \* \* \*